United States Patent [19]

Watanabe

[11] 4,187,017
[45] Feb. 5, 1980

[54] MOTOR DRIVE DEVICE IN A CAMERA
[75] Inventor: Sakuji Watanabe, Warabi, Japan
[73] Assignee: Nippon Kogaku K.K., Tokyo, Japan
[21] Appl. No.: 956,901
[22] Filed: Nov. 2, 1978
[30] Foreign Application Priority Data
Nov. 11, 1977 [JP] Japan .............................. 52/134703
[51] Int. Cl.$^2$ ........................... G03B 1/00; G03B 9/64
[52] U.S. Cl. .................................... 354/173; 354/238; 354/268
[58] Field of Search ................ 354/170, 171, 173, 50, 354/51, 60 R, 36, 38, 204–206, 212–215, 234, 235, 256, 258, 238, 267–268, 43, 44; 352/121, 137, 168, 174, 178; 242/71.4, 71.5

[56] References Cited
U.S. PATENT DOCUMENTS

| 3,186,319 | 1/1965 | Hochstein ........................ 352/178 X |
| 3,656,420 | 4/1972 | Aizawa et al. ........................ 354/173 |
| 3,820,141 | 6/1974 | Aizawa et al. ........................ 354/171 |
| 3,852,779 | 12/1974 | Yamamichi et al. .................... 354/51 |
| 3,896,459 | 7/1972 | Ogawa et al. ...................... 354/51 X |

Primary Examiner—George H. Miller, Jr.
Assistant Examiner—William B. Perkey
Attorney, Agent, or Firm—Shapiro and Shapiro

[57] ABSTRACT

In a motor drive device capable of being coupled to a camera having an automatic exposure control circuit for determining the aperture value and/or the shutter speed during exposure in accordance with the brightness of an object to be photographed, there is provided a delay circuit adapted to start operating upon closing of a main switch for the automatic exposure control circuit and generate a stability signal after the lapse of the time required for the control circuit to become stable in condition after being supplied with power, and means for operating the control circuit upon reception of both the stability signal and a photography signal supplied from a second switch.

4 Claims, 3 Drawing Figures

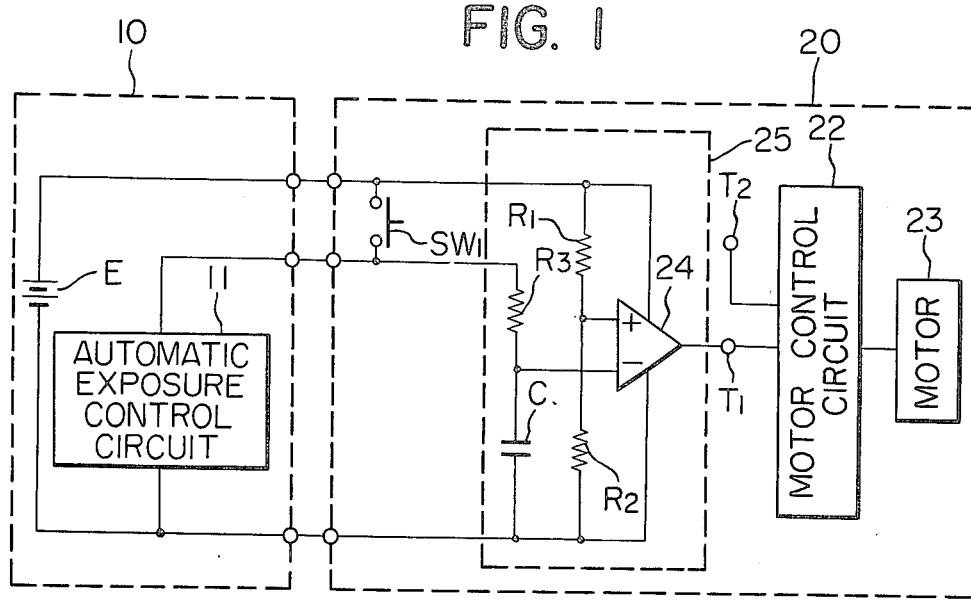
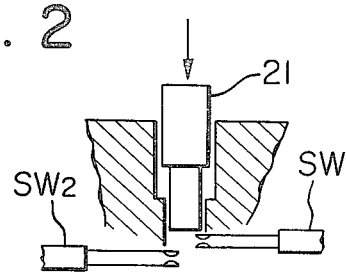
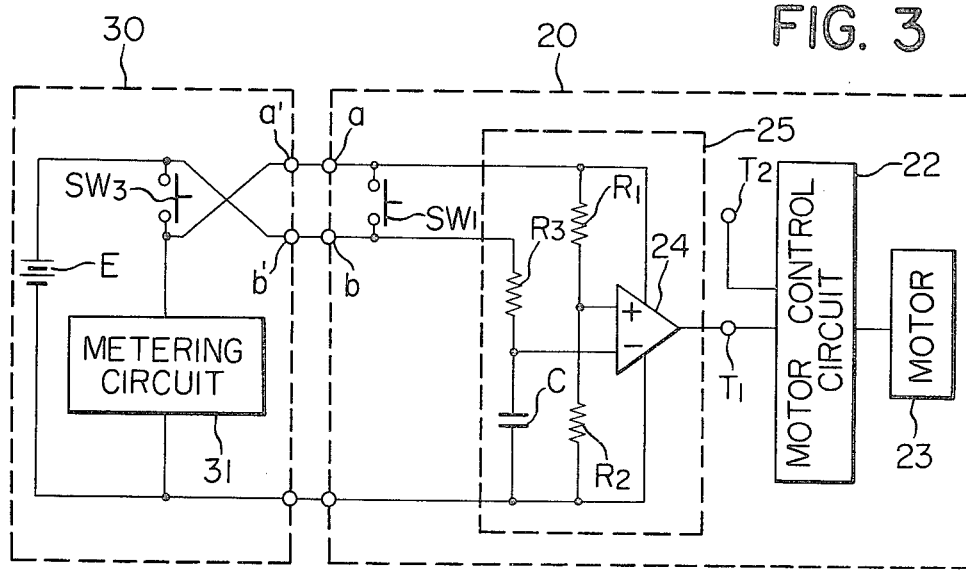

4,187,017

MOTOR DRIVE DEVICE IN A CAMERA

BACKGROUND OF THE INVENTION

1. Field of the Invention

This invention relates to a motor drive device in a camera, and more particularly to a motor drive device for driving a camera having an automatic exposure control circuit contained therein.

2. Description of the Prior Art

In a camera containing therein an automatic exposure control circuit having a light receiving element and for determining the aperture value or the shutter speed or both in accordance with the quantity of light from an object in order to obtain a proper exposure, the automatic exposure control circuit does not immediately start operating in a stable condition after it is supplied with a power. Therefore, in the prior art cameras, in order that shutter release may be effected after a power is supplied to the automatic exposure control circuit and the motor of the motor drive device in response to depression of the shutter release button and the automatic exposure control circuit has become stable in condition, the shutter release mechanism is operated through a delay mechanism such as a cam or the like operatively associated with the rotation of the motor. Thereafter, the film advance by the motor, the operation of the delay mechanism and the shutter release are repeated in succession to effect continuous photography at a proper exposure.

Accordingly, the shutter release takes place after the automatic exposure control circuit has become stable in condition and therefore, the automatic exposure control circuit is always in stable condition when photography is effected and advantageously, photography can be effected from a first frame onward reliably at a proper exposure.

However, when the rotation of the motor is transmitted to a shutter release mechanism through a delay mechanism, the result is that the delay mechanism is operated at each photographing operation to effect continuous photography. That is, the automatic exposure control circuit has already become stable in condition at the point of time whereat the first photography has been effected by depression of the shutter release button and in spite of such condition being maintained thereafter, the operation of the delay mechanism takes place at each photographying operation thereafter and this means a disadvantage of waste of time.

SUMMARY OF THE INVENTION

It is an object of the present invention to provide a motor drive device which enables photography to be effected rapidly without wasting time with the automatic exposure control circuit being in stable condition.

The invention will become fully apparent from the following detailed description thereof taken in conjunction with the accompanying drawings.

BRIEF DESCRIPTION OF THE DRAWINGS

FIG. 1 shows the connection in the control circuit of the present invention during automatic exposure control.

FIG. 2 shows the operation of the shutter release button.

FIG. 3 shows the connection in the control circuit of the present invention during manual exposure control.

DESCRIPTION OF THE PREFERRED EMBODIMENTS

Referring to FIG. 1, reference numeral 10 designates the body of an automatic exposure control type camera, and 20 a motor drive device. In the body 10, E denotes a power source and 11 an automatic exposure control circuit including a light receiving element. The motor drive device 20 is mountable to the camera body 10. The motor drive device is provided with a shutter release button 21, as shown in FIG. 2. The shutter release button 21 opens and closes switches SW1 and SW2 in a two-step stroke. The switch SW1 is closed in a first stroke of the shutter release button 21. The switch SW2 is closed in a second stroke of the shutter release button 21, in which the button 21 is further depressed, to thereby generate a photography signal by a known means. The signal is supplied to the terminal T2 of a control circuit 22 for controlling the operation of a motor 23. The automatic exposure control circuit 11 of the camera body side is supplied with a power from the power source E upon closing of the switch SW1 to determine the shutter speed or aperture value for obtaining a proper exposure in accordance with the output of the light receiving element which receives the light from the object side and previously set exposure factors. The output of the automatic exposure control circuit 11 sets the shutter speed or aperture value to a predetermined value immediately before the shutter is released through a known construction. A voltage divider circuit R1, R2 divides the voltage of the power source E and applies the divided voltage to the non inversion input terminal of a comparator 24. An integrating circuit comprising a resistor R3 and a capacitor C is supplied with a current from the power source E upon closing of the switch SW1 and applies the integrated voltage to the non-inversion input terminal of the comparator 24. When the integrated voltage exceeds the divided voltage, the comparator 24 transmits a low-level signal (hereinafter referred to as a stability signal) to the terminal T1 of the motor control circuit 22. This stability signal may be generated after the automatic exposure control circuit 11 is supplied with power and has become stable after lapse of a predetermined time. Thus, the comparator 24 generates the stability signal after lapse of a predetermined delay time from the closing of the switch SW1. The elements 24, R1, R2, R3 and C together constitute a delay circuit 25. The motor control circuit 22 is operable upon reception of the stability signal to the terminal T1 and the photography signal generated by the switch SW2 and applied to the terminal T2, to thereby repeat the shutter release and the winding operations such as film advance and shutter charge.

As is apparent from the foregoing description, in the present device, the automatic exposure control circuit 11 and the delay circuit 25 are operated in the first stroke in which the shutter release button 21 is depressed, and photography signal is generated in the second stroke of the shutter release button. When the motor control circuit 22 receives the stability signal produced at the delay circuit 25 after the automatic exposure control circuit 11 has become stable and the aforementioned photography signal, shutter release and the winding operation by the motor 23 are repeated successively, and continuous photography is effected as long as the shutter release button 21 is depressed and the switches SW1 and SW2 are closed. During such continuous photography, the capacitor C is charged after the photography of a first frame is completed, and the delay circuit 25 is always generating a stability signal, so that as long as the shutter release button is depressed over its full stroke, the motor drive device 20 is continuously operated to effect continuous photography at a proper exposure. Therefore, a delay time exists due to the operation of the delay circuit 25 before the first frame is photographed, but no delay time exists in the photographying operation from the second frame onward.

Description will now be made of a case where such motor drive device 20 is mounted to a camera in which all the exposure factors (film sensitivity, shutter speed, and aperture value) are set manually without modifying the motor drive device. In FIG. 3, numeral 30 designates the body of a manual exposure control camera and 20 designates a motor drive device constructed just in the same manner as the motor drive device shown in FIG. 1. In the camera body 30, a switch SW3 is a metering switch provided on the camera body side. A metering circuit 31 including a light receiving element is operable by being supplied with a power from a power source E upon closing of the metering switch SW3. Also, with the motor drive device 20 mounted to the camera body 30, the anode of the power source E is connected to the cathode of the power source E through terminals b' and b, switch SW1, terminals a and a' and metering circuit 31, so that the delay circuit 25 is always ready to generate a low-level signal (stability signal). Therefore, as soon as the switch SW2 is closed upon depression of the shutter release button 21 (FIG. 2), the motor control circuit 22 and motor 23 are operated to effect continuous photography. In this case, the setting of the exposure factors for obtaining a proper exposure is effected manually, before the depression of the shutter release button 21, by reference to the output of the metering circuit 31 which is operated by closing of the metering switch SW3. Also, after the depression of the shutter release button 21, the setting of the exposure factors is effected manually by reference to the output of the metering circuit 31 which is operated by closing of the switch SW1.

The aforementioned comparator 24 generates as output a low-level signal (stability signal) to operate the control circuit 22 and this is used as one of the signals for driving the motor drive device MD, so that when the output voltage of the power source E is decreased by consumption of the power source E, the voltage for biasing the comparator 24 may be decreased to generate a low-level signal. Therefore, even if the power source E is consumed, the motor control circuit and motor can be operated to effect photograhy. Of course, in that case, the power source for driving the motor must be a separate one from the consumed power source E and the automatic exposure control circuit and the metering circuit cannot be used.

Although the aforementioned shutter release button 21 is designed to close the switch SW1 in its first stroke and to close the switch SW2 in its second stroke, the two switches need not always be provided separately from each other but a single switch SW1 may be designed so as to generate a photography signal and closing signal at the same time. However, if two switches are provided as in the shown embodiment, it is possible to wait for a shutter chance with the shutter release button 21 slightly depressed to close the switch SW1 and during the waiting time, the automatic exposure control circuit 11, 31 may become stable in condition. Consequently, if the shutter release button 21 is further depressed at any desired time, the switch SW2 is closed to start photography at a proper exposure immediately thereafter without any delay time and enable a shutter chance to be caught reliably.

I claim:
1. In a motor drive device capable of being coupled to a camera having an automatic exposure control circuit for determining the aperture value and/or the shutter speed during exposure in accordance with the brightness of an object to be photographed and wherein upon depression of a shutter release button provided on said device, a main switch for said automatic exposure control circuit and a second switch for supplying a photography signal to a control circuit for operating a motor for driving said camera are closed, the improvement comprising:
   (a) delay circuit adapted to start operating upon closing of said main switch and generate a stability signal after the lapse of a predetermined time equal to the time equal to the time required for said automatic exposure control circuit to become stable in condition after being supplied with power; and
   (b) means for operating said control circuit upon reception of both said stability signal and said photography signal.
2. A device according to claim 1, further comprising:
   means for closing said main switch in a first half of the depression of said shutter release button; and
   means for closing said second switch in a second half of the depression of said shutter release button.
3. A device according to claim 1, wherein said control circuit includes:
   an integrating circuit connected to one end of said main switch;
   a voltage dividing circuit connected to the other end of said main switch; and
   voltage comparing means connected to said integrating circuit and said voltage dividing circuit.
4. A device according to claim 3, wherein said voltage comparing means generates said stability signal when the voltage put out by said integrating circuit has become higher than the voltage put out by said voltage dividing circuit.

* * * * *